(12) United States Patent
Seaton

(10) Patent No.: US 10,054,232 B2
(45) Date of Patent: Aug. 21, 2018

(54) SEALING SEGMENT

(71) Applicant: General Electric Technology GmbH, Baden (CH)

(72) Inventor: Jonathan David Seaton, Warwickshire (GB)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 14/864,111

(22) Filed: Sep. 24, 2015

(65) Prior Publication Data

US 2016/0097458 A1 Apr. 7, 2016

(30) Foreign Application Priority Data

Oct. 3, 2014 (EP) ...................................... 14187584

(51) Int. Cl.
*F16J 15/44* (2006.01)
*F16J 15/447* (2006.01)

(52) U.S. Cl.
CPC ........... *F16J 15/445* (2013.01); *F16J 15/443* (2013.01); *F16J 15/447* (2013.01)

(58) Field of Classification Search
CPC ...... F16J 15/4476; F16J 15/443; F16J 15/442; F16J 15/445; F16J 15/447
See application file for complete search history.

(56) References Cited

U.S. PATENT DOCUMENTS

| | | |
|---|---|---|
| 997,628 A | 7/1911 | Ljungstroem |
| 4,443,311 A | 4/1984 | Lichtin et al. |
| 5,002,288 A | 3/1991 | Morrison et al. |
| 5,085,443 A * | 2/1992 | Richards ............... B04B 3/02 277/412 |
| 5,190,440 A * | 3/1993 | Maier ................... F01D 11/02 277/412 |
| 5,211,535 A * | 5/1993 | Martin .................. F01D 11/02 277/413 |
| 5,603,510 A | 2/1997 | Sanders |
| 5,810,365 A | 9/1998 | Brandon et al. |
| 6,000,701 A | 12/1999 | Burgess |
| 6,022,027 A | 2/2000 | Chevrette et al. |

(Continued)

FOREIGN PATENT DOCUMENTS

| CN | 1417453 A | 5/2003 |
|---|---|---|
| DE | 522 872 C | 4/1931 |

(Continued)

OTHER PUBLICATIONS

Search Report dated Apr. 2, 2015, by the European Patent Office for Application No. 14187584.9.

(Continued)

*Primary Examiner* — Eugene G Byrd
(74) *Attorney, Agent, or Firm* — GE Global Patent Operation; Cynthia W. Flanigan

(57) ABSTRACT

The invention relates to a sealing segment for sealing between a stationary component and a rotating component. The sealing segment having a passage that extends so as to enable pressure balancing between radial ends of the sealing segment so by providing a seal that can ensure a minimum seal distance is maintained without the need for the complexities of actuators or other mechanical devices.

16 Claims, 1 Drawing Sheet

(56) References Cited

U.S. PATENT DOCUMENTS

| | | | | |
|---|---|---|---|---|
| 6,139,018 | A * | 10/2000 | Cromer | F16J 15/442 277/301 |
| 6,220,603 | B1 * | 4/2001 | Brandon | F01D 11/025 277/412 |
| 6,261,057 | B1 * | 7/2001 | Turnquist | F16J 15/3288 415/174.2 |
| 6,308,958 | B1 * | 10/2001 | Turnquist | F01D 11/02 277/347 |
| 6,367,806 | B1 * | 4/2002 | Turnquist | F16J 15/442 277/355 |
| 6,502,823 | B1 | 1/2003 | Turnquist et al. | |
| 6,572,115 | B1 | 6/2003 | Sarshar et al. | |
| 6,609,888 | B1 * | 8/2003 | Ingistov | F01D 11/005 415/113 |
| 6,655,696 | B1 | 12/2003 | Fang et al. | |
| 6,695,316 | B2 | 2/2004 | Popa et al. | |
| 6,786,487 | B2 | 9/2004 | Dinc et al. | |
| 8,454,023 | B2 * | 6/2013 | Samudrala | F01D 11/001 277/411 |
| 2007/0241514 | A1 * | 10/2007 | Orlowski | F16J 15/187 277/549 |
| 2008/0169616 | A1 * | 7/2008 | Awtar | F01D 11/025 277/593 |
| 2009/0196742 | A1 | 8/2009 | Turnquist et al. | |
| 2009/0274548 | A1 * | 11/2009 | Joco | F01D 11/02 415/112 |
| 2009/0297341 | A1 * | 12/2009 | Turnquist | F01D 11/04 415/173.3 |
| 2010/0078893 | A1 | 4/2010 | Turnquist et al. | |
| 2011/0068539 | A1 * | 3/2011 | Nakano | F01D 11/025 277/413 |
| 2012/0027573 | A1 | 2/2012 | Ali et al. | |
| 2012/0114466 | A1 * | 5/2012 | Zheng | F01D 11/003 415/170.1 |
| 2012/0211944 | A1 * | 8/2012 | Nishimoto | F16J 15/442 277/422 |
| 2014/0191475 | A1 | 7/2014 | Gupta et al. | |
| 2015/0345643 | A1 * | 12/2015 | Hoehle | F16J 15/187 277/410 |

FOREIGN PATENT DOCUMENTS

| | | |
|---|---|---|
| DE | 10 2009 003423 A1 | 8/2009 |
| JP | 61-108808 A | 5/1986 |
| WO | WO 2012/129475 A2 | 9/2002 |

OTHER PUBLICATIONS

Search Report dated Apr. 2, 2015, by the European Patent Office for Application No. 14187585.6.

The extended European Search Report dated Feb. 16, 2016, by the European Patent Office in corresponding European Patent Application No. 15184151.7-1751. (9 pages).

Machine Translation and First Office Action and Search issued in connection with corresponding CN Application No. 201510643361.2 dated Jan. 26, 2018.

\* cited by examiner

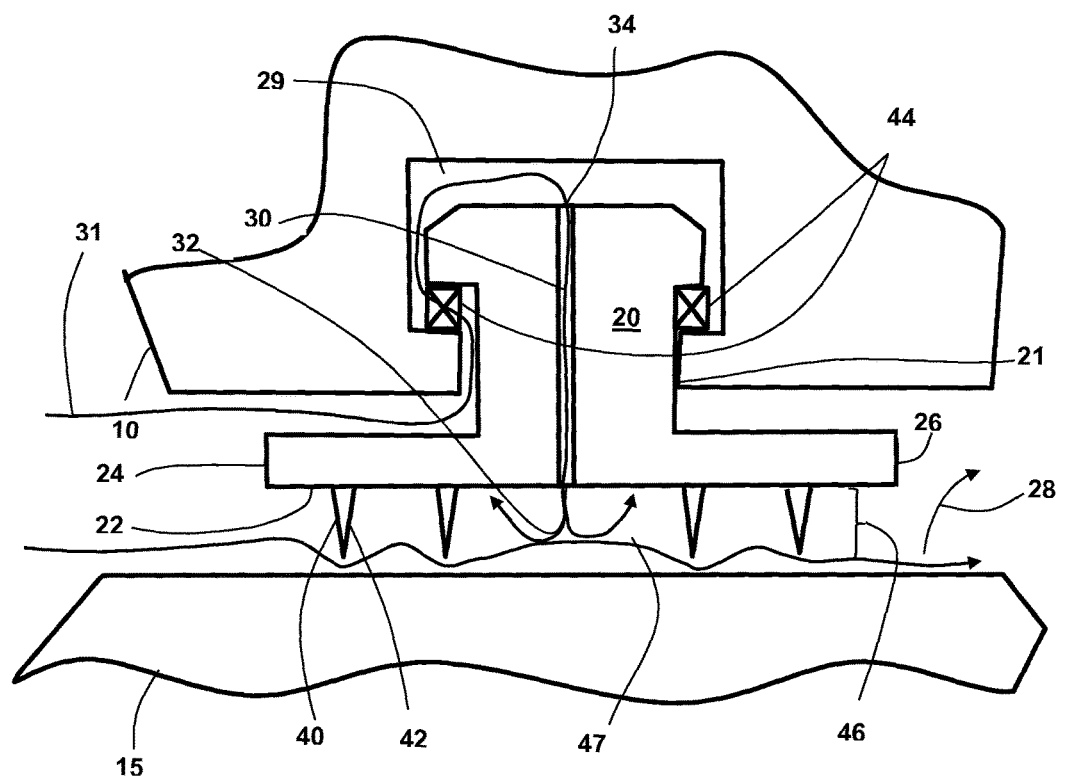

SEALING SEGMENT

TECHNICAL FIELD

The present invention relates generally to seal segment for rotary machines such as steam turbines, gas turbines, aircraft engines, and compressors and more specifically to retractable seal segments.

BACKGROUND INFORMATION

Rotary machines such as steam and gas turbines used for power generation and mechanical drive applications, aircraft engines used for propulsion, and compressors used for pressurization, are generally large machines consisting of multiple turbine and compressor stages. In such machines, pressurised fluid flowing through the turbine and/or compressor stages passes through a series of stationary and rotary components. In a typical steam turbine, the stationary components may be a machine casing while the rotary component may be a rotor. Annular seals mounted on the stationary components are used to control leakage of fluid along the path between the stationary and rotary components. In fact, the efficiency of the turbine is directly dependent on the ability of these seals to prevent such leakage. These seals can be radial or axial in orientation, and can be one of several kinds such as labyrinth packing seals, leaf seals, abradable seals, compliant plate seals, etc. Radial seals are often segmented for assembly reasons and/or for displacement in the radial direction. While radial segmented labyrinth seals have proved to be quite reliable in steam turbines, their performance degrades over time as a result of transient events in which the stationary and rotary components interfere, rubbing the labyrinth teeth into a "mushroom" profile and opening the seal clearance.

One means of reducing the negative effects of rubs or contact during transient events has been to employ the variable clearance "positive-pressure" (VCPP) arrangement, in which springs are used to hold the seal segments open at a large running clearance under the no- or low-flow transient conditions, when such rubbing is most likely to occur. During steady-state conditions, when the machine is typically operating at a higher load with higher fluid pressures, the ambient pressure around the seal segment overcomes the spring force acting to close the rings to a close running clearance. Examples of known variable clearance positive-pressure (VCPP) labyrinth seals may be found in U.S. Pat. Nos. 6,695,316; 6,022,027; 5,810,365; 5,603,510; 5,002,288; and 4,443,311.

However, the variable clearance positive-pressure arrangement employs segmented seals that respond solely to the machine load. Once the machine reaches a design load, the packing ring segments close and remain closed until the machine load, and therefore the fluid pressure inside the machine, drops adequately. Thermal transients may persist, however, even after the design load has been reached. Therefore, it is ideally desired that the seal segments remain open until the thermal transients subside. Furthermore, the VCPP seals are susceptible to rubbing in case of rotor vibrations during steady-state operation, when the seal segments are forced closed by the ambient fluid pressure. In such circumstances, the current VCCP arrangement is not effective in avoiding rubs since it is a passive method for positioning the seal segments. It would be desirable to provide an "actively controlled" seal positioning arrangement in which the seal segments are held open not just during no- or low-flow conditions, which correspond to the start-up and shut-down transients, but that a minimum seal distance can be maintained in dependent of load and transient effects.

So-called "Smart Seals" employ high force capacity pneumatic actuators to provide a radially outward force to "actively" open the seal segments under any machine operating condition. The need to preserve actuator life, however, requires pressure balancing that is achieved by means of pressure control systems. Also, the actuators must be externally pressurized to overcome the fluid ambient pressure, which necessitates an external high-pressure gas supply system. Examples of "Smart Seals" configurations may be found in U.S. Pat. Nos. 6,786,487; 6,655,696; 6,572,115 and 6,502,823.

SUMMARY

A seal segment is disclosed that can ensure a minimum seal distance is maintained without the need for the complexities of actuators or other mechanical devices.

The disclosure is based on the general idea of a bypass around the first seal elements of a retractable seal that enable a bypass flow to create a pressure cushion is in the seal gap as the seal closes, thereby providing a self-adjustable minimum seal gap control system.

One general aspect includes a sealing system for sealing between a stationary component and a rotating component, the sealing system includes a stationary component and a sealing segment, which is retractable located in the stationary component so as form a flow region between the stationary component and the sealing segment, the sealing segment has an inner arcuate surface with an upstream end and a downstream end orthogonal to a curvature of the inner surface. The sealing segment also includes a plurality of sealing elements arranged in a plurality of rows that are arranged between on the inner arcuate surface between the upstream end and the downstream end and extend in a direction of the curvature of the inner arcuate surface. A passage extends through the sealing segment having a first opening in the inner arcuate surface between the plurality of rows of the sealing elements such that at least one of the plurality of sealing rows is arranged between the first opening and the upstream end and at least one of the plurality of sealing rows is arranged between the first opening and the downstream end, thereby forming a bypass flow path, which includes at least a portion of the flow region, extending from an upstream end of the sealing segment and through the passage so by enabling the formation of fluid cushion that creates retracting force on the sealing segment towards the stationary components.

Further aspects may include one or more of the following features. A sealing system where the passage has a second opening located between the upstream end and the downstream end so as to enable a flow of fluid to bypass the at least one plurality of sealing rows arranged between the opening and upstream end. A sealing system where the first opening and the second opening are arranged such that a line drawn between the first opening and the second opening is orthogonal to the inner arcuate surface. A sealing system where the passage has a second opening located towards the upstream end so as to enable a flow of fluid to bypass the at least one plurality of sealing rows arranged between the opening and upstream end. A sealing segment where the passage is cylindrical in shape. A sealing system where the passage is configured and arranged to direct fluid flow passing through the first opening perpendicular to the inner arcuate surface. A sealing system further comprising a biasing means for retracting the seal segment away from a direction of facing of the inner arcuate surface.

It is a further object of the invention to overcome or at least ameliorate the disadvantages and shortcomings of the prior art or provide a useful alternative.

Other aspects and advantages of the present disclosure will become apparent from the following description, taken in connection with the accompanying drawings which by way of example illustrate exemplary embodiments of the present invention.

BRIEF DESCRIPTION OF THE DRAWINGS

By way of example, an embodiment of the present disclosure is described more fully hereinafter with reference to the accompanying drawings, in which:

FIG. 1 is a schematic of a preferred embodiment of the disclosure

DETAILED DESCRIPTION

Exemplary embodiments of the present disclosure are now described with references to the drawings, wherein like reference numerals are used to refer to like elements throughout. In the following description, for purposes of explanation, numerous specific details are set forth to provide a thorough understanding of the disclosure. However, the present disclosure may be practiced without these specific details, and is not limited to the exemplary embodiment disclosed herein.

An exemplary embodiment of a retractable sealing segment 20 is shown in FIG. 1 that provides a seal between a stationary component 10 and a rotating component 15. The sealing segment 20 comprises common features of a sealing segment 20 including an inner arcuate surface 22 that has an upstream end 24 at a higher pressure region, and a downstream end 26. These ends 24, 26 are orthogonal to a curvature of the inner arcuate surface 22. A plurality of sealing elements 40 are arranged in a plurality of sealing rows 42 that are arranged between on the inner arcuate surface 22 between the upstream end 24 and the downstream end 26 and extend in the direction of the curvature 28 of the inner arcuate surface 22. In this way the seal elements 40 provide a sealing between the upstream end 24 of the inner arcuate surface 22 and the downstream end 26 of the inner arcuate surface 22.

The sealing segment 20 is a retractable seal defined by the fact that it may retract towards the stationary component 10 away from the rotating component 15. The relative movement of the sealing segment 20 enables the formation of a flow region 29 that enables a flow from an upstream end of the sealing segment 20 to the back of the seal segment 20. Flow may be prevented from further continuing behind the seal segment 20 to the downstream end of the seal segment 20 by a contact point 21 located between the sealing segment 20 and the stationary component 10 acting as a seal. The sealing at the contact point 21 may be enhanced by, for example, axial thrust exerted on the seal segment 20 as a result of a pressure drop formed between the upstream and downstream ends of the sealing segment 20.

In an exemplary embodiment shown in FIG. 1, the sealing segment 20 further includes a biasing mean 44 such as a spring, leaver or the like, that biases the inner arcuate surface 22 away from the direction of facing of the inner arcuate surface 22. The purpose of the spring is to provide a means to open the seal to counter-act closing pressure and gravitational force exerted on the sealing segment 20 during start up and low load. In an exemplary embodiment shown in FIG. 1 the biasing means 44 is located between the stationary component 10 and the sealing segment 20. In a not shown exemplary embodiment, the biasing means 44 is located between adjacent sealing segments 20 on circumferentially facing surfaces of the sealing segments 20.

In an exemplary embodiment shown in FIG. 1, the sealing segment 20 further includes a passage 30 that extends through the sealing segment 20. The passage 30 has a first opening 32 and second opening 34.

The first opening 32 opening in the inner arcuate surface 22 between the plurality of sealing rows 42 of the sealing elements 40, such that at least one of the plurality of sealing rows 42 is arranged between the first opening 32 and the upstream end 24 of the inner arcuate surface 22 and at least one of the plurality of sealing rows 42, is arranged between the first opening 32 and the downstream end 26 of the inner arcuate surface 22.

The second opening 34 is located on a surface of the sealing segment 20 other than the inner arcuate surface 22, preferably either between the upstream end 24 and the downstream end 26 of the sealing segment 20 as shown in FIG. 1 or at a point towards the upstream end 24. That is, at a point between the mid-point of the upstream end 24 and the downstream end 26 and the upstream end 24. The purpose of the passage is to create a bypass around the sealing element 40 located between the first opening 32 and the upstream end 24 that utilises leakage flow that may pass around the back of the seal, via the flow region 29. In this way, when the sealing segment 20 is fully open, corresponding to a wide seal gap 46, the flow passed the seal is low, due to a low pressure drop and as a result there is a low flow around the back of the seal and down through the passage 30. In this arrangement, the passage 30 has only a negligible influence on the sealing segment 20 performance. As the seal gap 46 closes, for example by pressure loading on the sealing segment 20, a cavity 47 is formed in the region of the first opening 32 by the inner arcuate surface 22, sealing elements 40 and the rotating component 15. The closing of the seal gap 46 further results in an increase in pressure drop across the downstream sealing elements 40 resulting in a proportionally larger flow through the passage 30 into the sealing cavity 47 and a pressure force equalisation between the radial top and radial bottom, i.e. the inner arcuate surface 22, of the seal segment 20 which counter balances the pressure acting on top of the seal with pressure within the sealing cavity 47 acting on the inner arcuate surface 22 in the opposite direction. Any further increase in the pressure acting on top of the seal is unable to overcome the sealing opening force of the biasing means 44. In this way the passage 30 acts as a self-controlling means to prevent complete closure of the sealing segment 20.

In this position the flow through the passage 30 is a higher proportion of the flow through the gap 46 due to the area of the passage 30 being a larger fraction of the area between the seals 40 and the rotor 15. The pressure in the cavity 47 will also be higher. Pressure in cavity 47 will tend towards the pressure at an upstream end 24 with increasing movement of the seal 20 towards the rotor 15. The sealing segment 20 will continue to move inwards until a radial force balance is achieved due to pressure acting on the arcuate surface 22 and pressure acting on the outer arcuate surface of the seal element 20. Further closure of the gap 46 will result in pressure in the cavity 47 increasing and the seal segment 20 moving away from the rotor 15 until a new radial force balance is achieved due to pressure acting on the arcuate surface 22 and pressure acting on the outer arcuate surface of seal element 20. In this way the passage 30 acts as a self-controlling means to prevent complete closure of the sealing segment 20.

The pressure in the seal gap 46 caused by the bypass flow through the passage 30 is a function of the pressure drop over the top of the sealing segment 20 and through the passage 30 and therefore is a function of the location of the second opening 34 and the cross sectional area of the passage 30. An optimal seal gap 46 is therefore achieved by adapting these parameters to the particular operating conditions of an installation.

In particular for retrofit solutions, if may be advantageous to ensure that the passage 30 forms a straight path as this enables simple configuration by drilling of the sealing segment 20.

In an exemplary embodiment shown in FIG. 1, the passage 30 is configured and arranged to direct fluid flow passing through the first opening 32 perpendicular to the inner arcuate surface 22. This reduces the risk of instability of the sealing segment 20 resulting from flow through the passage 30 into the seal gap 46.

Although the disclosure has been herein shown and described in what is conceived to be the most practical exemplary embodiment, the present disclosure can be embodied in other specific forms. For example, although one from of retractable springs have be shown in the Figures, any suitable spring arrangement may use. The presently disclosed embodiments are therefore considered in all respects to be illustrative and not restricted. The scope of the disclosure is indicated by the appended claims rather that the foregoing description and all changes that come within the meaning and range and equivalences thereof are intended to be embraced therein.

REFERENCE NUMBERS 10 stationary component
15 rotating component
20 sealing segment
21 contact point
22 inner arcuate surface
24 upstream end (of the inner arcuate surface)
26 downstream end (of the inner arcuate surface)
28 direction of curvature (of the inner arcuate surface)
29 flow region
30 passage
31 bypass flow
32 first opening (of the passage)
34 second opening (of the passage)
40 sealing element
42 row
44 biasing means
46 seal gap
47 sealing cavity

The invention claimed is:

1. A sealing system for sealing between a stationary component and a rotating component of a rotary machine, the sealing system comprising:
    the stationary component;
    a sealing segment, retractably located in the stationary component so as to form a flow region between the stationary component and the sealing segment, the sealing segment including:
        an inner arcuate surface, with an upstream end and a downstream end orthogonal to a curvature of the inner arcuate surface; and a plurality of sealing elements arranged in a plurality of sealing rows that are arranged on the inner arcuate surface between the upstream end and the downstream end and extend in a direction of the curvature of the inner arcuate surface;
    a passage, extending through the sealing segment and connecting to a flow path, having a first opening in the inner arcuate surface between the plurality of sealing rows of the sealing elements such that:
        at least one of the plurality of sealing rows is arranged between the first opening and the upstream end, and
        at least one of the plurality of sealing rows is arranged between the first opening and the downstream end,
        thereby forming a bypass flow path, which includes at least a portion of the flow region, extending from the upstream end of the sealing segment and through the passage, configured to create, as a result of a flow of fluid through the bypass flow path, a retracting force on the sealing segment towards the stationary component;
    a biasing means located between the stationary component and the sealing segment, wherein the biasing means counter-act closing pressure and gravitational force exerted on the sealing segment during a start-up or low load stage of the rotary machine; and
    a contact point, located between the sealing segment and the stationary component, forming a seal to prevent the flow of fluid to continue behind the sealing segment to the downstream end.

2. The sealing system of claim 1 wherein the passage has a second opening located between the upstream end and the downstream end so as to enable the flow of fluid to bypass the at least one of the plurality of sealing rows arranged between the first opening and the upstream end.

3. The sealing system of claim 1 wherein the passage has a second opening located towards the upstream end so as to enable the flow of fluid to bypass the at least one of the plurality of sealing rows arranged between the first opening and the upstream end.

4. The sealing system of claim 2 wherein the first opening and the second opening are arranged such that a line drawn between the first opening and the second opening is orthogonal to the inner arcuate surface.

5. The sealing system of claim 1 wherein the passage is cylindrical in shape.

6. The sealing system of claim 1 wherein the passage is configured and arranged to direct fluid flow passing through the first opening perpendicular to the inner arcuate surface.

7. The sealing system of claim 1 wherein the biasing means is configured to bias the inner arcuate surface of the sealing segment in a direction away from a direction facing the inner arcuate surface.

8. The sealing system of claim 7 wherein the biasing means is located on a circumferentially facing face of the sealing segment.

9. The sealing system of claim 3 wherein the first opening and the second opening are arranged such that a line drawn between the first opening and the second opening is orthogonal to the inner arcuate surface.

10. The sealing system of claim 4 wherein the passage is cylindrical in shape.

11. The sealing system of claim 10 wherein the passage is configured and arranged to direct fluid flow passing through the first opening perpendicular to the inner arcuate surface.

12. The sealing system of claim 3, wherein the biasing means retract the sealing segment away from a direction of facing of the inner arcuate surface.

13. The sealing system of claim 11, wherein-the biasing means retract the sealing segment away from a direction of facing of the inner arcuate surface.

14. The sealing system of claim 13 wherein the biasing means is located on a circumferentially facing face of the sealing segment.

15. The sealing system of claim 1 wherein an increase in pressure drop across the plurality of sealing elements results in an increased flow of fluid through the bypass flow path into the flow path resulting in the retracting force on the sealing segment towards the stationary component.

16. The sealing system of claim 1 wherein the flow of fluid through the bypass flow path is a flow of leaked fluid that passes from back of the sealing segment to enter the bypass flow path.

* * * * *